United States Patent
Baucco et al.

(10) Patent No.: US 11,220,928 B1
(45) Date of Patent: Jan. 11, 2022

(54) TURBINE SHROUD ASSEMBLY WITH CERAMIC MATRIX COMPOSITE COMPONENTS AND COOLING FEATURES

(71) Applicant: Rolls-Royce Corporation, Indianapolis, IN (US)

(72) Inventors: Alexandra Baucco, Indianapolis, IN (US); Aaron D. Sippel, Zionsville, IN (US); Ted J. Freeman, Danville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/000,905

(22) Filed: Aug. 24, 2020

(51) Int. Cl.
*F01D 25/12* (2006.01)
*F02C 7/12* (2006.01)

(52) U.S. Cl.
CPC ............ *F01D 25/12* (2013.01); *F02C 7/12* (2013.01); *F05D 2220/32* (2013.01); *F05D 2230/64* (2013.01); *F05D 2240/14* (2013.01); *F05D 2260/201* (2013.01); *F05D 2300/6033* (2013.01)

(58) Field of Classification Search
CPC ........ F01D 11/08; F01D 25/246; F01D 25/12; F02C 7/12; F05D 2220/32; F05D 2230/64; F05D 2240/14; F05D 2260/201; F05D 2300/6033
See application file for complete search history.

(56) References Cited

U.S. PATENT DOCUMENTS

| | | | |
|---|---|---|---|
| 4,087,199 A | 5/1978 | Hemsworth et al. | |
| 4,527,385 A * | 7/1985 | Jumelle | F01D 11/18 415/116 |
| 5,368,444 A | 11/1994 | Anderson | |
| 5,639,210 A * | 6/1997 | Carpenter | H01Q 7/00 415/135 |
| 6,315,519 B1 | 11/2001 | Bagepalli et al. | |
| 6,877,952 B2 | 4/2005 | Wilson | |
| 6,884,026 B2 | 4/2005 | Glynn et al. | |
| 7,416,362 B2 | 8/2008 | North | |
| 7,563,071 B2 | 7/2009 | Campbell et al. | |
| 7,874,059 B2 | 1/2011 | Morrison et al. | |
| 8,647,055 B2 | 2/2014 | Foster et al. | |
| 8,740,552 B2 | 6/2014 | Marusko et al. | |
| 8,753,073 B2 | 6/2014 | Albers et al. | |
| 8,834,105 B2 | 9/2014 | Albers et al. | |
| 8,905,709 B2 | 12/2014 | Dziech et al. | |
| 9,726,043 B2 | 8/2017 | Franks et al. | |
| 9,863,265 B2 | 1/2018 | Stapleton et al. | |
| 10,087,784 B2 | 10/2018 | Shapiro et al. | |
| 10,132,194 B2 | 11/2018 | Vetters | |
| 10,184,352 B2 | 1/2019 | O'Leary et al. | |
| 10,301,960 B2 | 5/2019 | Stapleton et al. | |
| 10,378,386 B2 | 8/2019 | Roussille et al. | |
| 10,378,387 B2 | 8/2019 | Baldiga et al. | |
| 10,415,415 B2 | 9/2019 | Rice et al. | |
| 10,422,241 B2 | 9/2019 | McCaffrey et al. | |
| 10,428,688 B2 | 10/2019 | Quennehen et al. | |

(Continued)

*Primary Examiner* — Justin D Seabe
*Assistant Examiner* — Theodore C Ribadeneyra
(74) *Attorney, Agent, or Firm* — Barnes & Thornburg LLP

(57) ABSTRACT

An assembly adapted for use in a gas turbine engine includes a carrier and a blade track segment. The carrier extends at least partway about an axis. The blade track segment is supported by the carrier radially relative to the axis to define a portion of a gas path of the assembly.

16 Claims, 9 Drawing Sheets

(56) References Cited

U.S. PATENT DOCUMENTS

| | | |
|---|---|---|
| 10,465,558 B2 | 11/2019 | Shapiro et al. |
| 10,677,084 B2 | 6/2020 | Smoke et al. |
| 10,801,350 B2* | 10/2020 | Walston .................. F01D 11/08 |
| 2004/0047726 A1* | 3/2004 | Morrison .................. F01D 9/04 |
| | | 415/116 |
| 2008/0178465 A1* | 7/2008 | Schiavo ................ F01D 25/246 |
| | | 29/889.21 |
| 2013/0004306 A1 | 1/2013 | Albers et al. |
| 2014/0271147 A1* | 9/2014 | Uskert .................... F01D 11/22 |
| | | 415/173.2 |
| 2016/0186611 A1* | 6/2016 | Vetters ...................... F01D 9/04 |
| | | 415/173.2 |
| 2016/0208635 A1* | 7/2016 | Vetters .................. F01D 21/003 |
| 2018/0023408 A1* | 1/2018 | Rice ...................... F01D 25/005 |
| | | 415/173.1 |
| 2018/0051591 A1 | 2/2018 | Quennechen et al. |
| 2018/0073398 A1 | 3/2018 | Quennehen et al. |
| 2021/0025284 A1 | 1/2021 | Sippel et al. |

* cited by examiner

TURBINE SHROUD ASSEMBLY WITH CERAMIC MATRIX COMPOSITE COMPONENTS AND COOLING FEATURES

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine shroud assembly adapted for use in a gas turbine engine may include a carrier, a blade track segment, and an intermediate carrier. The carrier may comprise metallic materials, while the blade track segment may comprise ceramic matrix composite materials. The carrier may be arranged to extend circumferentially at least partway about a center axis. The intermediate carrier may be configured to couple the blade track segment to the carrier In some embodiments, the carrier may be formed to include a cooling passageway. The cooling passageway may be configured to conduct cooling air through the carrier.

In some embodiments, the blade track segment may be formed to include a runner, a first mount post, and a second mount post. The runner may be shaped to extend circumferentially partway around the center axis. The first mount post may extend radially outward from the runner. The second mount post may extend radially outward from the runner. In some embodiments, the second mount post may be spaced apart axially from the first mount post to define a channel therebetween.

In some embodiments, an intermediate carrier may include an intermediate carrier body, at least one pin, and a retainer. The intermediate carrier body may be arranged axially between the first mount post and the second mount post. The pin may extend axially into the first mount post, the intermediate carrier body, and the second mount post to couple the intermediate carrier body to the blade track segment. The retainer may extend radially and couple the intermediate carrier body with the carrier.

In some embodiments, the intermediate carrier body may be formed to include an impingement passageway. The impingement passageway may have an inlet aligned with an outlet of the cooling passageway. The inlet of the impingement passageway may align with the outlet of the cooling passageway such that the cooling air is configured to be conducted from the cooling passageway, through the impingement passageway, and directed toward the runner included in the blade track segment to cool the blade track segment.

In some embodiments, the turbine shroud assembly may further include an impingement tube. The impingement tube may extend into the cooling passageway and the impingement passageway to direct the cooling air toward the runner included in the blade track segment.

In some embodiments, the impingement tube may define a main passageway and an auxiliary passageway. The main passageway may extend radially through the impingement tube. The auxiliary passageway may extend at an angle relative to the main passageway. The auxiliary passageway may be in fluid communication with the main passageway so that the cooling air is directed toward the runner and toward the intermediate carrier body.

In some embodiments, the impingement tube may be brazed to the carrier to fix the impingement tube to the carrier. In some embodiments, the impingement tube may be press fit through the cooling passageway into the carrier to fix the impingement tube to the carrier.

In some embodiments, the retainer may extend along a retainer axis. The retainer axis may extend radially relative to the center axis.

In some embodiments, the impingement tube may be spaced apart circumferentially from the retainer and extends along a tube axis. The tube axis may be parallel to the retainer axis.

In some embodiments, the carrier may include a carrier body and an impingement tube. The impingement tube may extend radially from the carrier body to direct cooling air toward the runner. In some embodiments, the impingement tube may be spaced apart circumferentially from the entire intermediate carrier.

In some embodiments, the carrier may include a carrier body and a carrier boss. The carrier boss may extend radially inward from the carrier body into the inlet of the impingement passageway.

In some embodiments, the impingement passageway may be shaped to include a first portion and a second portion. The first portion may have a first cross-sectional area. The second portion may define an inlet and may have a second cross-sectional area that is greater than the first cross-sectional area.

In some embodiments, the intermediate carrier may further include an impingement boss. The impingement boss may be integrally formed with the intermediate carrier body. The impingement boss may extend radially away from the intermediate carrier body through the cooling passageway and the impingement passageway may extend through the impingement boss.

In some embodiments, the impingement passageway may be shaped to include a first portion and a second portion. The first portion may have a first cross-sectional area. The second portion may define an outlet and may have a second cross-sectional area that is greater than the first cross-sectional area.

According to another aspect of the present disclosure, a turbine shroud assembly adapted for use in a gas turbine engine may include a carrier, a blade track segment, and an intermediate carrier. The carrier may extend at least partway circumferentially around a central axis. The carrier may be formed to define a cooling passageway that extends through the carrier.

In some embodiments, the blade track segment may include a runner and an attachment portion. The runner may be shaped to extend circumferentially partway around the central axis. The attachment portion may extend radially outward from the runner.

In some embodiments, the intermediate carrier may include an intermediate carrier body and a first retainer. The intermediate carrier body may be coupled with the attachment portion of the blade track segment. The first retainer may extend radially and couple the carrier with the intermediate carrier.

In some embodiments, the intermediate carrier body may be formed to include an impingement passageway. The impingement passageway may have an inlet and an exit. The inlet may be aligned with an outlet of the cooling passageway. The exit may be arranged to direct air toward the blade track segment.

In some embodiments, the turbine shroud assembly may further includes an impingement tube. The impingement tube may extend into the cooling passageway and the impingement passageway. In some embodiments, the impingement tube may be brazed or press fit to the carrier to fix the impingement tube to the carrier.

In some embodiments, the impingement tube may define a main passageway and an auxiliary passageway. The main passageway may extend radially through the impingement passageway. The auxiliary passageway may extend at an angle relative to the main passageway. In some embodiments, the auxiliary passageway may be in fluid communication with the main passageway so that the cooling air is directed toward the runner and toward the intermediate carrier body.

In some embodiments, the carrier may include a carrier body and an impingement tube. The impingement tube may extend radially from the carrier body to direct cooling air toward the runner. In some embodiments, the impingement tube may be spaced apart circumferentially from the entire intermediate carrier.

In some embodiments, the first retainer may extend along a retainer axis. The retainer axis may extend radially relative to the central axis.

In some embodiments, the impingement tube may be spaced apart circumferentially from the first retainer and extends along a tube axis. The tube axis may be parallel to the retainer axis.

In some embodiments, the carrier may include a carrier body and a carrier boss. The carrier boss may extend radially inward from the carrier body into the inlet of the impingement passageway.

In some embodiments, the intermediate carrier may further include an impingement boss. The impingement boss may be integrally formed with the intermediate carrier body.

In some embodiments, the impingement boss may extend radially away from the intermediate carrier body through the cooling passageway. The impingement passageway may extend through the impingement boss.

According to another aspect of the present disclosure, a method may include providing a carrier, a blade track segment, an intermediate carrier, and an impingement tube. The blade track segment may include a runner shaped to extend partway around an axis, a first mount post that extends radially outward from the runner, and a second mount post spaced apart axially from the first mount post that extends radially outward from the runner.

In some embodiments, the method may further include arranging the intermediate carrier axially between the first mount post and the second mount post of the blade track segment. In some embodiments, the method may further include inserting a pin through the first mount post, the intermediate carrier, and the second mount post to couple the blade track segment to the intermediate carrier body.

In some embodiments, the method may further include inserting the impingement tube into a cooling passageway defined in the carrier, fixing the impingement tube to the carrier, and arranging the intermediate carrier in an attachment space formed in the carrier so that the impingement tube extends through the impingement passageways. In some embodiments, the method further include coupling the intermediate carrier with the carrier.

These and other features of the present disclosure will become more apparent from the following description of the illustrative embodiments.

DETAILED DESCRIPTION OF THE DRAWINGS

Figure 1:
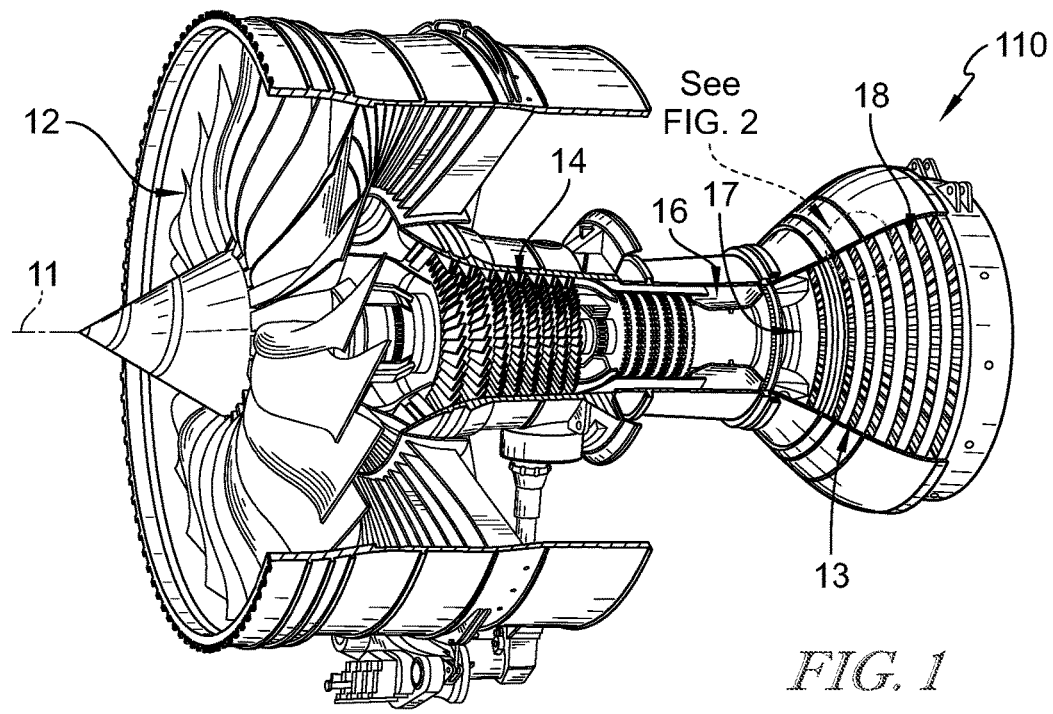
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 22 adapted for use in a gas turbine engine 10 is shown in FIGS. 2-7. The turbine shroud segment 22 includes a carrier 24, a blade track segment 26, an intermediate carrier 28 configured to couple the blade track segment 26 to the carrier 24 as shown in FIGS. 2-7. The carrier 24 is a metallic support component configured to interface with other metallic components of the gas turbine engine 10. The blade track segment 26 is a ceramic matrix composite component configured to directly face the high temperatures of a gas path 17 of the gas turbine engine 10. The intermediate carrier 28 is designed to engage the blade track segment 26 so as to couple the blade track segment 26 to the carrier 24 and distribute mounting of the blade track segment 26 to the carrier 24.

The intermediate carrier 28 includes an intermediate carrier body 32, at least one pin, illustratively two pins 33, 34, and a plurality of retainers 36 as shown in FIGS. 2-8. The intermediate carrier body 32 is arranged adjacent to an attachment portion of the blade track segment 26. The pins 33, 34 extend axially through an attachment portion 79 of the blade track segment 26 and the intermediate carrier body 32 to couple the blade track segment 26 to the intermediate carrier body 32. Each of the retainers 36 extends outward from the intermediate carrier body 32 to the carrier 24 and engages the carrier 24 to couple the intermediate carrier 28 to the carrier 24.

As such, the intermediate carrier body 32 is formed to include an impingement passageway 40 that has an inlet 42 aligned with an outlet 73 of the cooling passageway 72 formed in the carrier 24. In this way, cooling air is configured to be conducted from the cooling passageway 72, through the impingement passageway 40, and directed toward the runner 78 included in the blade track segment 26 to cool the blade track segment 26.

In the illustrative embodiment, the turbine shroud segment 22 includes an impingement tube 30 as shown in FIGS. 2-7. The impingement tube 30 extends into the cooling passageway 72 and the impingement passageway 40 to direct the cooling air toward the runner 78 included in the blade track segment 26.

The impingement tube 30 is brazed to the carrier 24 to fix the impingement tube 30 to the carrier 24 in the illustrative embodiment. In other embodiments, the impingement tube 30 may be fixed to the carrier 24 using other suitable methods.

Figure 7:
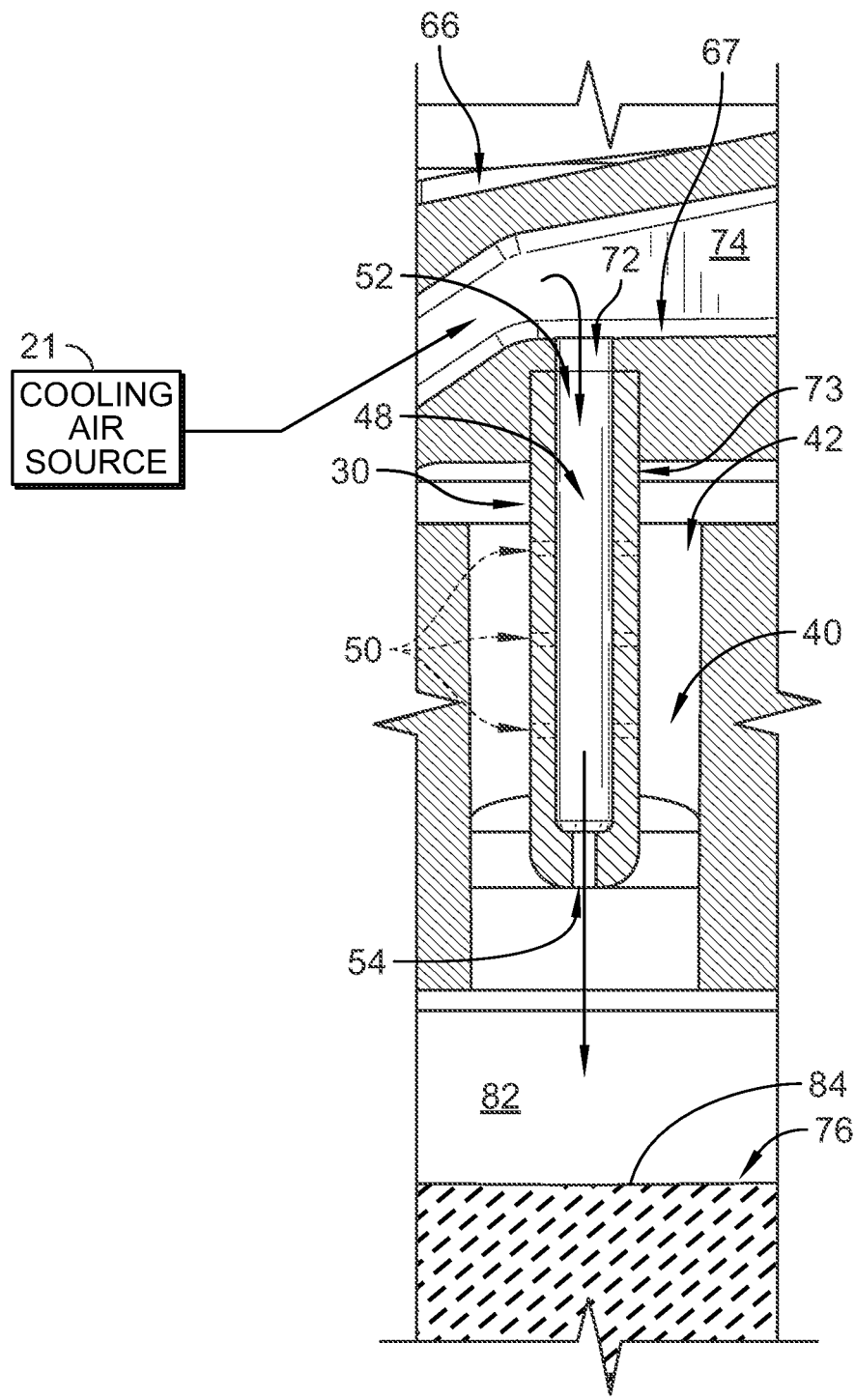
FIG. 7 is a detail cross-sectional view of the turbine shroud assembly of FIG. 5 showing the impingement tube includes a main passageway that extends radially through the impingement tube and an auxiliary passageway that is in fluid communication with the main passageway to direct cooling air at the runner of the blade track segment and the intermediate carrier body.
Figure 8:
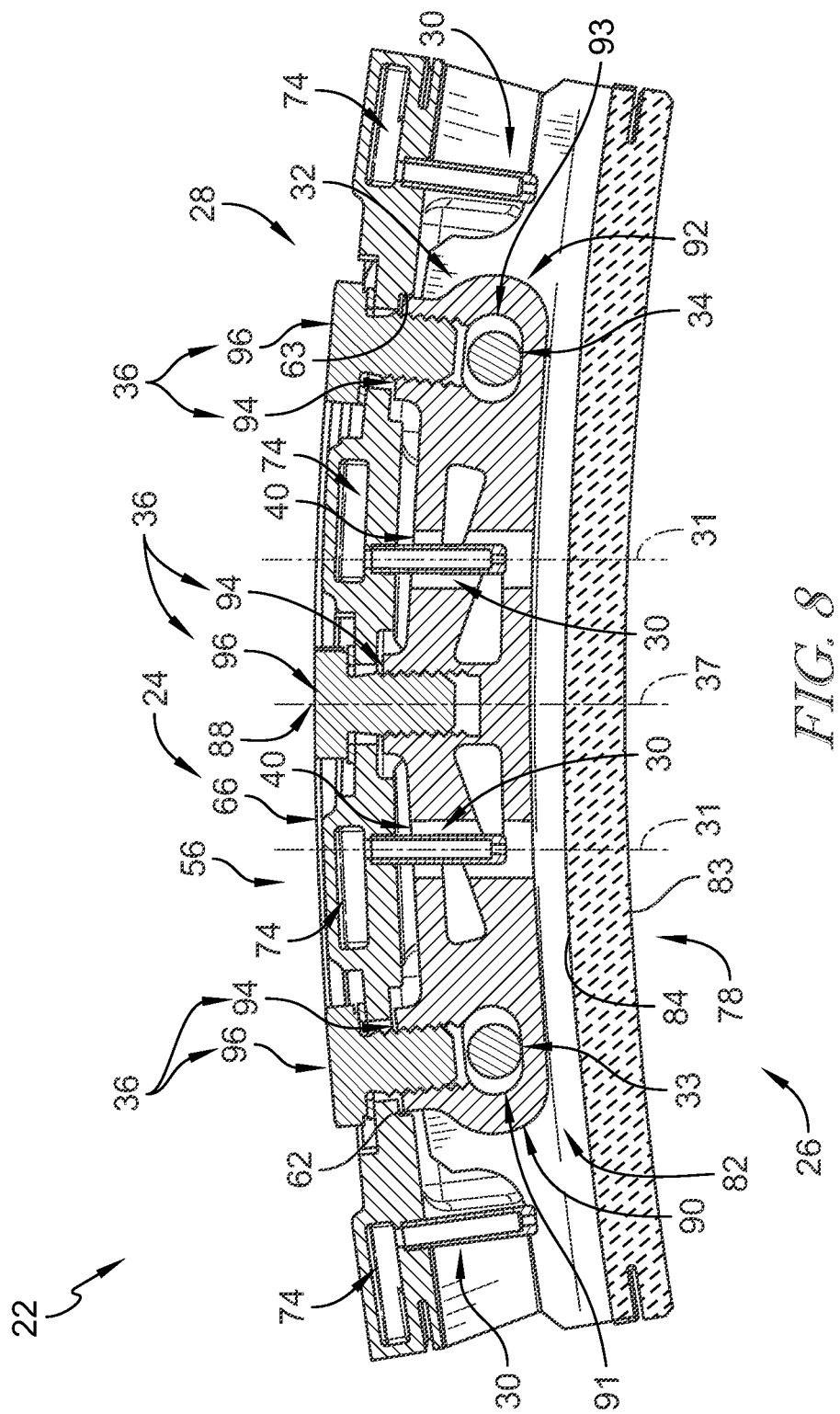
FIG. 8 is a cross-sectional view of the turbine shroud assembly of FIG. 3 taken along line 8-8 showing the plurality of impingement tubes are spaced apart circumferentially so that one impingement tube is located between each of the retainers.

In the illustrative embodiment, the turbine shroud segment 22 includes a plurality of impingement tubes 30 as shown in FIG. 8. Each impingement tube 30 of the plurality of impingement tubes 30 extends into the corresponding cooling passageway 72 and directs the cooling air toward the runner 78 included in the blade track segment 26. Each of the impingement tubes 30 includes a main passageway 48 as shown in FIG. 7. The main passageway 48 extends radially through the impingement tube 30. The main passageway 48 has an inlet 52 and an outlet 54 spaced radially inward from the inlet 52.

In some embodiments, the impingement tubes 30 may also include and an auxiliary passageway 50 as suggested in FIG. 7. The auxiliary passageway 50 extends at an angle α relative to the main passageway 48 and is in fluid communication with the main passageway 48 so that the cooling air is directed toward the runner 78 of the blade track segment 26 and toward the intermediate carrier body 32. In some embodiments, the impingement tube 30 may define a plurality of auxiliary passageways 50 as suggested in FIG. 7. The auxiliary passageways 50 are spaced apart along the length of the impingement tube 30.

In the illustrative embodiment, the inlet 52 of the main passageway 48 has a first cross-sectional area and the outlet 54 of the main passageway 48 has a second cross-sectional area. The second cross-sectional area of the outlet 54 is less than the first cross-sectional area of the inlet 52. In other embodiments, the first cross-sectional area of the inlet 52 and second cross-sectional area of the outlet 54 are the same.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
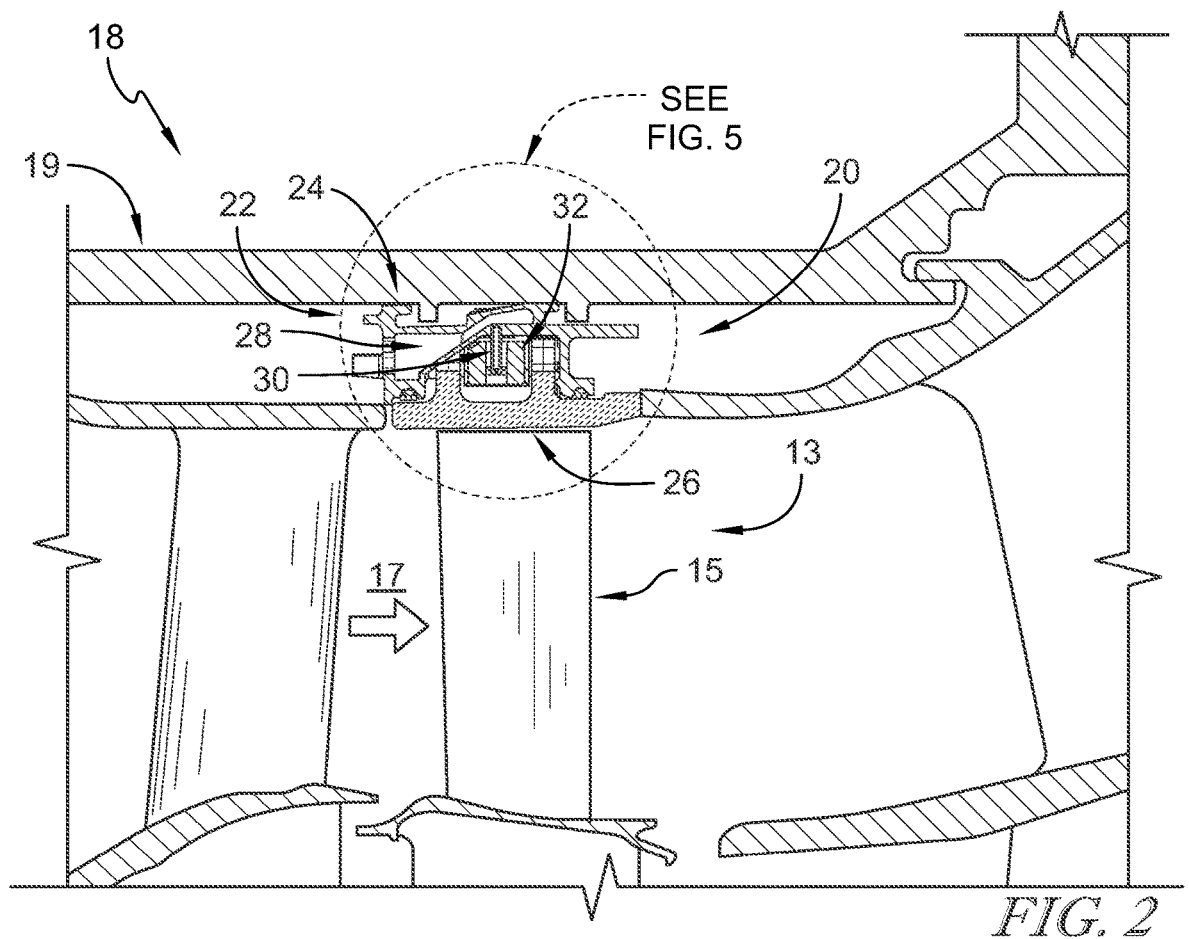
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assembly 13 along the gas path 17. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of shroud segments 22, one of which is shown in FIGS. 3-7, that extend only partway around the central axis 11 and cooperate to surround the turbine wheel assembly 13. The shroud segments 22 are sealed against one another, such as by strip seal members, to provide a continuous turbine shroud assembly 20.

Each shroud segment 22 includes the carrier 24, the blade track segment 26, the intermediate carrier 28, and the plurality of impingement tubes 30 as shown in FIGS. 2-7. In other embodiments, the turbine shroud assembly 20 is annular and non-segmented to extend fully around the central axis 11 and surround the turbine wheel assembly 13. In yet other embodiments, certain components of the turbine shroud assembly 20 are segmented while other components are annular and non-segmented.

The carrier 24 included in each shroud segment 22 is coupled to the case 19 of the engine 10 as shown in FIG. 2. In the illustrative embodiment, the carrier 24 is segmented, while in other embodiments, the carrier 24 may be a full hoop and extend about the axis 11.

Each carrier segment 24 illustratively includes a carrier body 56, a plurality of locating pads 58, 59, and a plurality of orientation features 60, 61, 62, 63 as shown in FIGS. 4-6 and 8. The carrier body 56 extends partway around the axis 11 and is shaped to form an attachment-receiving space 57. The plurality of locating pads 58, 59 each extend radially inward from the carrier body 56 into contact with a radially-outwardly facing surface 85 of the attachment portion 79 of the blade track segment 26 to radially locate the blade track segment 26 relative to the carrier 24. The orientation features 60, 61, 62, 63 extend radially inward from the carrier body 56 and engage the intermediate carrier 28 to axially and circumferentially orientate the intermediate carrier 28 relative to the carrier 24.

The carrier body 56 includes an outer wall 66, hangers 68, fore and aft walls 70, 71, and feed cavities 74 as shown in FIGS. 4-8. The outer wall 66 extends circumferentially partway about the axis 11 and is shaped to include through holes that receive a portion of the retainers 36. The hangers 68 extend radially outward from the outer wall 66 and engage the case 19 to couple the turbine shroud segment 22 to the rest of the engine 10. Each of the fore and aft walls 70, 71 extend radially inward from the outer wall 66 on opposite axial ends of the outer wall 66. The aft wall 71 is spaced apart axially from the fore wall 70 to define the attachment-receiving space 57 therebetween that receives the attachment portion 79 of the blade track segment 26. The feed cavities 74 extend into the fore wall 70 and are configured to receive air from a cooling air source 21 included in the gas turbine engine 10.

In the illustrative embodiment, the feed cavities 74 are defined between the outer wall 66 and an inner portion 67 of the outer wall 66. The cooling passageway 72 extends through the inner portion 67 to the attachment-receiving space 57. The cooling passageways 72 are in fluid communication with the corresponding feed cavity 74 or feed cavities 74 as shown in FIGS. 2-7. Each cooling passageway 72 extends through the fore wall 70.

Figure 4:
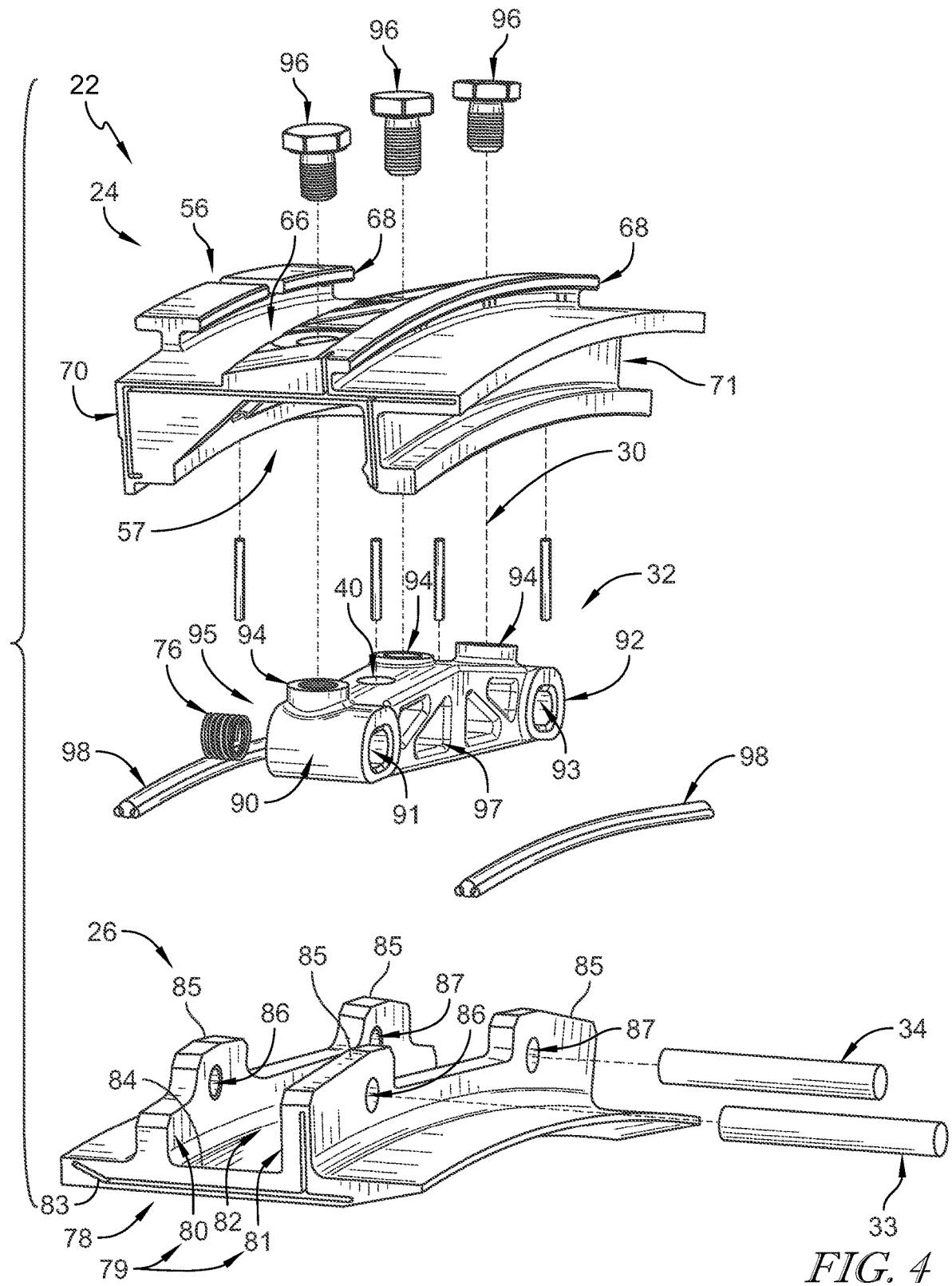
FIG. 4 is an exploded view of the turbine shroud assembly of FIG. 3 showing, from top to bottom, the carrier, a plurality of impingement tubes, the intermediate carrier, and the blade track segment, and showing that the intermediate carrier includes an intermediate carrier body, a plurality of pins configured to axially extend through the blade track segment and the intermediate carrier body, and retainers that extend radially through the carrier to couple the intermediate carrier to the carrier.
Figure 6:
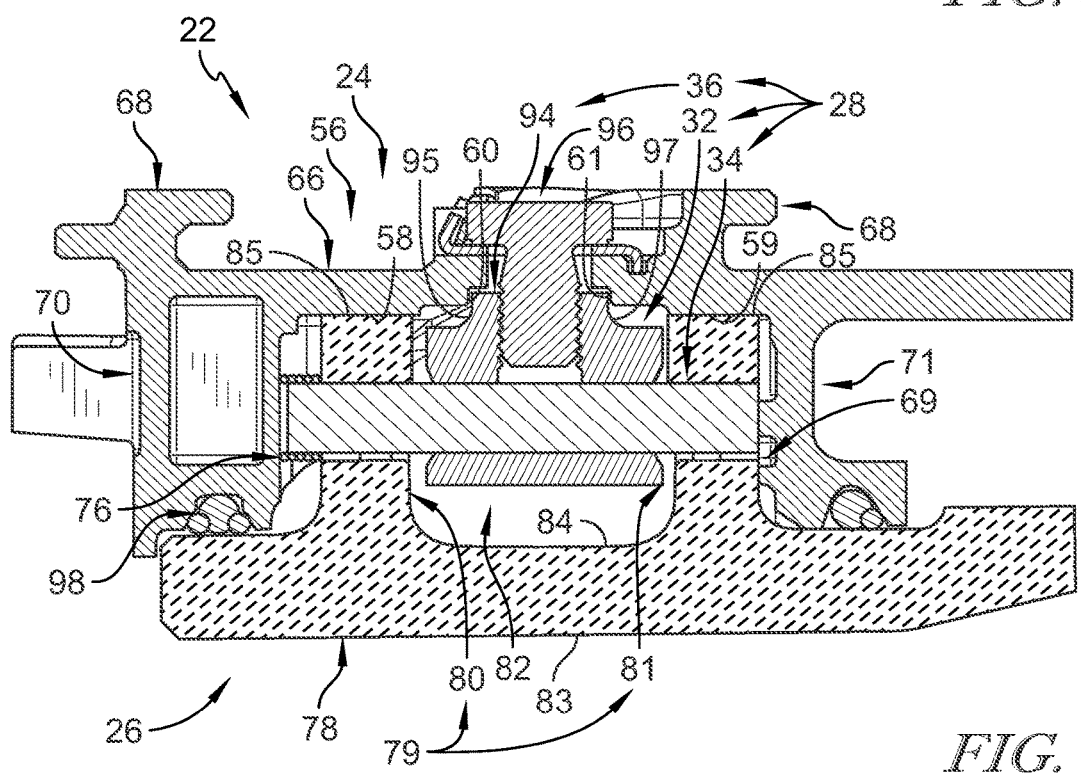
FIG. 6 is a cross-sectional view of the turbine shroud assembly of FIG. 3 taken along line 6-6 showing the carrier including a carrier body, a plurality of locating pads that each extend radially inward from the carrier body into contact with the blade track segment to radially locate the blade track segment relative to the carrier, and a plurality of orientation features that extend radially inward from the carrier body and engage the intermediate carrier to axially and circumferentially orientate the intermediate carrier relative to the carrier.

In the illustrative embodiment, the attachment-receiving space 57 of the carrier 24 is pressurized such that the pressure biases the attachment portion 79 of the blade track segment 26 axially aft against a chordal seal 69 formed in the aft wall 71 of the carrier body 56. To aid in the axial location of the attachment portion 79 of the blade track segment 26 on the chordal seal 69, the turbine shroud segment 22 further includes a bias member 76 as shown in FIGS. 4 and 6. The bias member 76 is arranged between the attachment portion 79 of the blade track segment 26 and the fore wall 70 of the carrier 24 and configured to bias the blade track segment 26 axially aft against the chordal seal 69.

Figure 5:
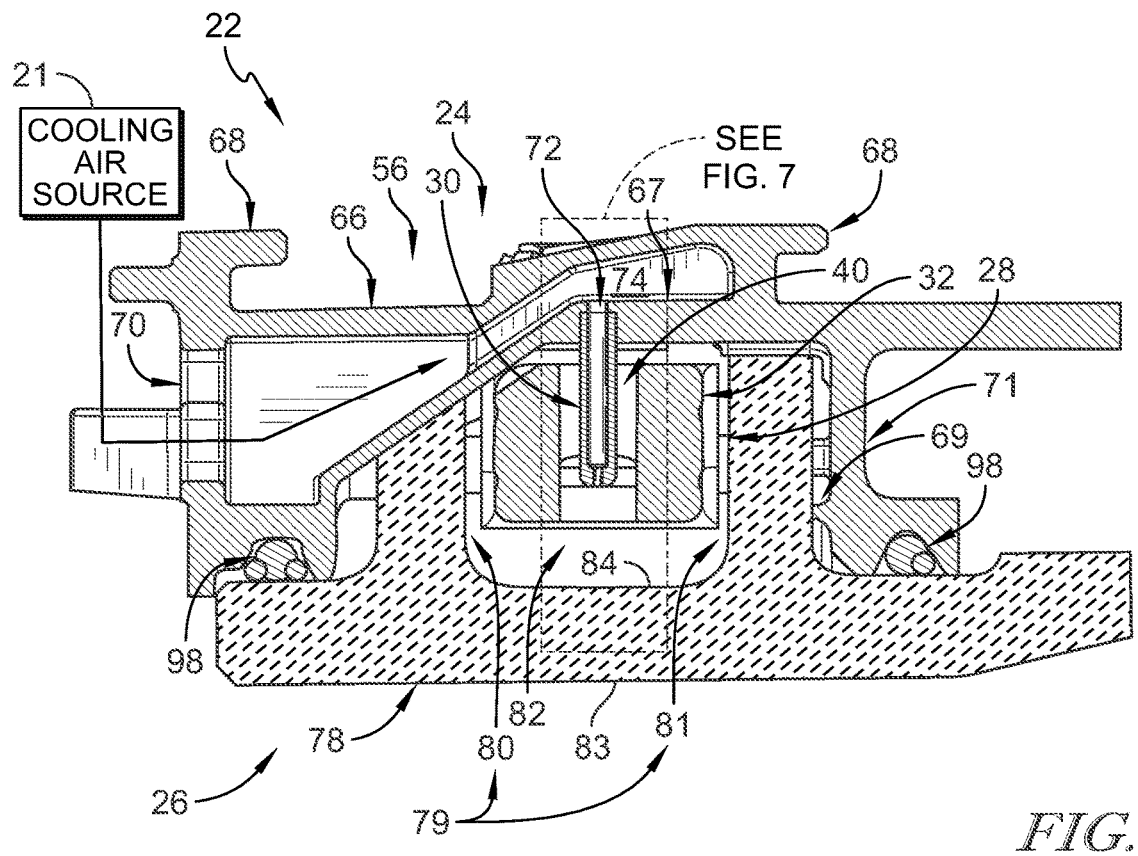
FIG. 5 is a cross-sectional view of the turbine shroud assembly of FIG. 3 taken along line 5-5 showing the impingement tubes are coupled to the carrier and extend through the intermediate carrier body.

In the illustrative embodiment, the turbine shroud segment 22 further includes a plurality of seals 98 as shown in FIGS. 4-6. The seals 98 may be tandem seals 98 that are arranged in channels formed in the fore and aft radial walls 70, 71 of the carrier 24. The seals 98 are configured to engage the runner 78 of the blade track segment 26 to seal the attachment-receiving space 57. In this way, the attachment-receiving space 57 may be pressurized.

The blade track segment 26 of each shroud segment 22 comprises ceramic matrix composite materials as suggested in FIGS. 2 and 5-7. The blade track segment 26 is held in place adjacent to tips of blades 15 to block combustion products from passing over the blades 15 without pushing the blades 15 to rotate.

The blade track segment 26 is illustratively formed to include the runner 78 and the attachment portion 79 as shown in FIGS. 4-8. The runner 78 is arcuate and extends partway around axis 11 adjacent to blades 15. The runner 78 defines a flow path surface 83 that faces the gas path 17 of the gas turbine engine 10 and the backside surface 84 that faces radially outward toward the carrier 24. The attachment portion 79 extends radially outward from the backside surface 84 of the runner 78 to provide structure for coupling the blade track segment 26 to the carrier 24.

In the illustrative embodiment, the attachment portion 79 includes a first mount post 80 and a second mount post 81 as shown in FIGS. 4-6. Each mount post 80, 81 extends radially outward from the runner 78. The second mount post 81 is spaced apart axially from the first mount post 80 to define a channel 82 therebetween. In other embodiments, the attachment portion 79 may be provided by L-shaped hangers, fir-tree shaped members, dovetail members, box shape panels, or other suitable features.

In the illustrative embodiment, the intermediate carrier body 32 is located in the channel 82 axially between the first mount post 80 and the second mount post 81 as shown in FIG. 5. Each of the pins 33, 34 extends axially through the first mount post 80, the intermediate carrier body 32, and the second mount post 81. The locating pads 58, 59 of the carrier 24 engage at least one of a radially-outwardly facing surface 85 of the first mount post 80 and the second mount post 81.

In the illustrative embodiment, the locating pads 58, 59 are spaced apart axially as shown in FIG. 5. One locating pad 58 engages the radially-outwardly facing surface 85 of the first mount post 80 and another locating pad 59 engages the radially-outwardly facing surface 85 of the second mount post 81.

In the illustrative embodiment, the carrier 24 includes at least two locating pads 58 that engage the first mount post 80 and at least two locating pads 59 that engage the second mount post 81. The two locating pads 58 are spaced apart circumferentially such that the locating pads 58 engage the first mount post 80 at two circumferential locations. The locating pads 59 are spaced apart circumferentially such that the locating pads 59 engage the second mount post 81 at two circumferential locations.

The intermediate carrier body 32 is shaped to include pin holes 91, 93 on circumferential ends 90, 92 of the intermediate carrier body 32 as shown in FIGS. 4 and 8. The first pin hole 91 extends axially through the intermediate carrier body 32 on a first circumferential end 90 of the intermediate carrier body 32. The second pin hole 93 extends axially through the intermediate carrier body 32 on a second circumferential end 92 of the intermediate carrier body 32 opposite the first circumferential end 90.

In the illustrative embodiment, each of the first mount post 80 and the second mount post 81 are also shaped to include corresponding pin holes 86, 87 as shown in FIG. 4. The first pin hole 86 extends axially through the first mount post 80 and is axially aligned with the first pin hole 86 that extends axially through the second mount post 81. The second pin holes 87 is spaced apart circumferentially from the first pin hole 86. The second pin hole 87 extends axially through the first mount post 80 and is axially aligned with the second pin hole 87 that extends axially through the second mount post 81.

The first pin 33 extends axially through the first pin hole 86 formed in the first mount post 80, the first pin hole 91 of the intermediate carrier body 32, and the first pin hole 86 formed in the second mount post 81 to couple the blade track segment 26 to the intermediate carrier body 32. In the illustrative embodiment, the second pin 34 extends axially through the second pin hole 87 formed in the first mount post 80, the second pin hole 93 of the intermediate carrier body 32, and the second pin hole 87 formed in the second mount post 81 to couple the blade track segment 26 to the intermediate carrier body 32.

Each of the retainers 36 each include a coupling 94 and a fastener 96 as shown in FIGS. 4-6 and 8. The coupling 94 is integrally formed with the intermediate carrier body 32 and extends radially outward from the intermediate carrier body 32. The fastener 96 extends radially inward through the corresponding hole formed in the outer wall 66 into the corresponding coupling 94. The fasteners 96 have threads 99 that mate with corresponding threads formed in the coupling 94 to couple the intermediate carrier 28 with the assembled blade track segment 26 to the carrier 24. The fasteners 96 may be tightened to bring the radially-outwardly facing surface 85 of the mount posts 80, 81 into contact with the locating pads 58, 59 of the carrier 24.

Figure 3:
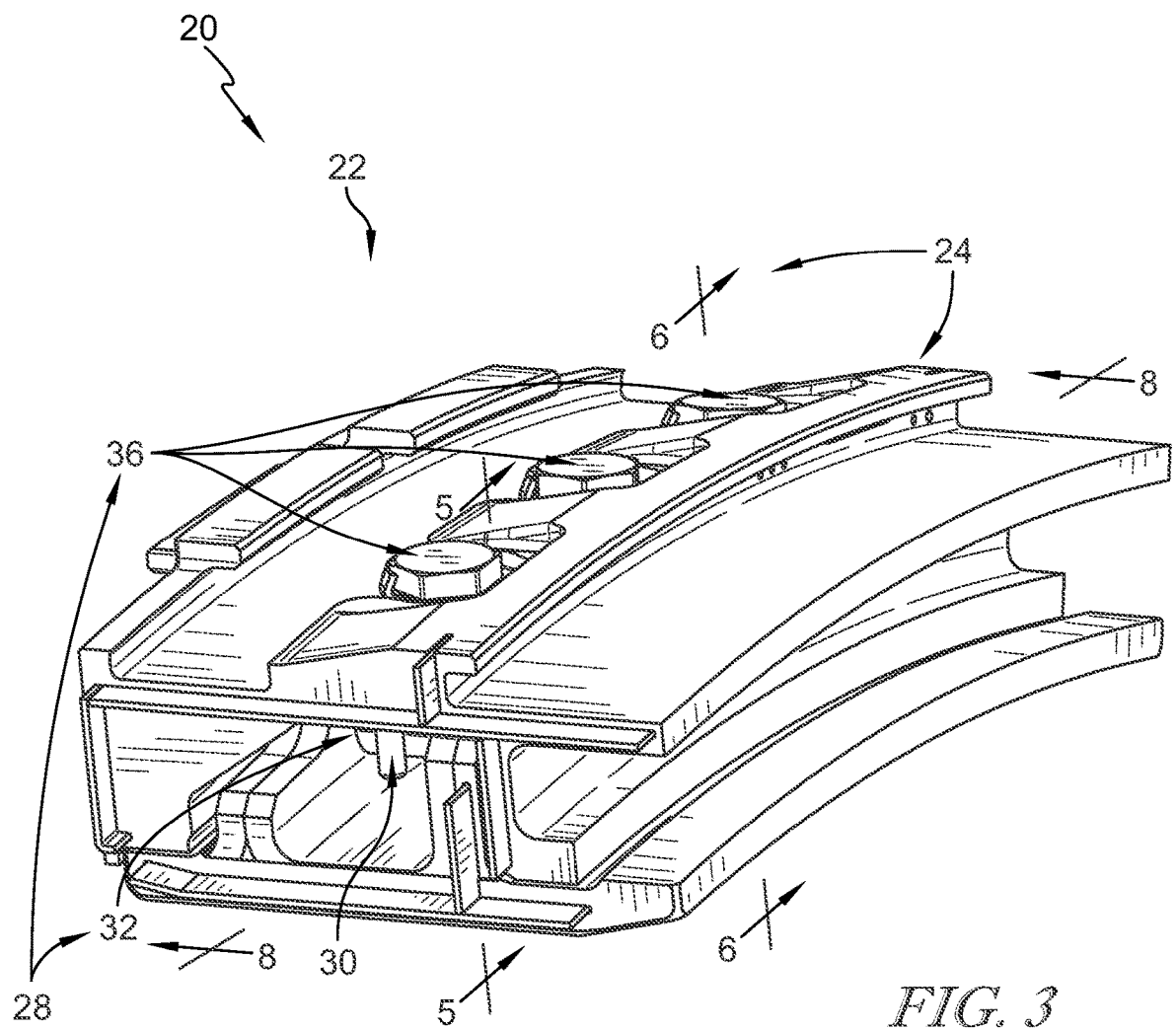
FIG. 3 is a perspective view of a portion of the turbine shroud assembly of FIG. 2 showing the turbine shroud assembly includes a carrier, a blade track segment made from ceramic matrix composite materials, and an intermediate carrier for coupling the blade track segment to the carrier.

In the illustrative embodiment, the intermediate carrier body 32 includes at least three retainers 36 as shown in FIGS. 3, 4, and 8. One retainer 36 extends outward from the intermediate carrier body 32 at a center 88 of the intermediate carrier body 32 along a retainer axis 37. The retainer axis 37 extends radially relative to the central axis 11. The other two retainers 36 are located at opposite circumferential ends 90, 92 of the intermediate carrier body 32.

In the illustrative embodiment, one impingement tube 30 is spaced apart circumferentially from the center retainer 36 and another impingement tube 30 is spaced apart circumferentially from the center retainer 36 opposite the one impingement tube 30. Each of the impingement tubes 30 located circumferentially between the retainers 36 extend along a tube axis 31. The tube axis 31 is parallel to the retainer axis 37. In this way, the impingement tubes 30 are parallel to each other as well as the retainer axis 37.

In the illustrative embodiments, other impingement tubes 30 spaced apart circumferentially from the entire immediate carrier body as shown in FIG. 8. One impingement tube 30 is spaced circumferentially from the first circumferential end 90 of the intermediate carrier body, while another impingement tube 30 is spaced circumferentially from the second circumferentially end 92 of the intermediate carrier body. Both impingement tubes 30 extend radially from the carrier body 56.

In other embodiments, each retainer 36 may include a stud and a fastener nut. The stud may be integrally formed with the intermediate carrier body 32 and extend outward from the intermediate carrier body 32 through slots formed in the carrier 24. The fastener nut may mate with corresponding threads included in the stud radially outward of the carrier 24 to couple the intermediate carrier 28 with the carrier 24.

The orientation tabs 60, 61 formed in the outer wall 66 of the carrier body 56 are configured to engage the intermediate carrier 28 on opposite axial sides 95, 97 as shown in FIG. 6. The axial orientation tabs 60, 61 are configured to axially align the intermediate carrier 28 relative to the carrier 24 so that the intermediate carrier 28 is in a predetermined axial position relative to the carrier 24.

In the illustrative embodiment, the axial orientation tabs 60, 61 engage the coupling 94 of the corresponding retainer 36 on the opposite axial sides 95, 97 as shown in FIG. 6. One orientation tab 60 engages the fore side 95 of the coupling 94, while the other orientation tab 61 engages the aft side 97 of the coupling 94. The orientation tabs 60, 61 are configured to axially orientate the intermediate carrier 28 relative to the carrier 24.

The circumferential orientation tabs 62, 63 formed in the outer wall 66 of the carrier body 56 are configured to engage the coupling 94 of the corresponding retainer 36 at the opposite circumferential ends 90, 92 of the intermediate carrier body 32 as shown in FIG. 8. One circumferential orientation tab 62 engages the first circumferential end 90 of the intermediate carrier body 32, while the other circumferential orientation tab 63 engages the second circumferential end 92 of the intermediate carrier body 32. The circumferential orientation tabs 62, 63 are configured to circumferentially orientate the intermediate carrier body 32 relative to the carrier 24.

A method of assembling the turbine shroud segment 22 includes several steps. The method begins by arranging the intermediate carrier body 32 axially between the first mount post 80 and the second mount post 81. The intermediate carrier body 32 is arranged in the channel 82 such that the pin holes 91, 93 formed in the intermediate carrier body 32 align circumferentially with the pin holes 86, 87 in both the first mount post 80 and the second mount post 81.

After arranging the intermediate carrier body 32 between the mount posts 80, 81, one of the pins 34 is inserted through the corresponding pin hole 86 formed in the first mount post 80, the corresponding pin hole 91 formed in the intermediate carrier body 32, and the corresponding pin hole 86 formed in the second mount post 81 to couple the blade track segment 26 to the intermediate carrier body 32. This step is repeated for the other pin 34 such that the pin 34 extends through the corresponding pin hole 87 formed in the first mount post 80, the corresponding pin hole 93 formed in the intermediate carrier body 32, and the corresponding pin hole 87 formed in the second mount post 81.

In some embodiments, after the pins 33, 34 are inserted into the blade track segment 26 and intermediate carrier body 32 to couple the components 26, 32 together, the bias member 76 is arranged on one end of the pin 33, 34 before the assembled components 26, 32 are arranged in the attachment-receiving space 57 of the carrier 24.

Before the assembled blade track segment 26 and intermediate carrier body 32 may be arranged in the attachment-receiving space 57, the impingement tubes 30 are fixed to the carrier 24. To fix the impingement tubes 30 to the carrier 24, each impingement tube 30 is inserted into the corresponding cooling passageway 72 defined in the carrier 24. Each impingement tube 30 is then brazed to the carrier 24 to fix the impingement tubes 30 to the carrier 24.

With impingement tubes 30 fixed to the carrier 24, the assembled blade track segment 26 and the intermediate carrier body 32 are arranged in the attachment-receiving space 57 formed in the carrier 24. The assembled blade track segment 26 and intermediate carrier 28 are arranged such that the impingement tubes 30 extend through the impingement passageways 40 formed in the intermediate carrier body 32 and the holes in the carrier 24 align with the couplings 94.

In some embodiments, before the assembled blade track segment 26 and intermediate carrier body 32 are arranged in the attachment-receiving space 57, the method includes arranging the seals 98 in channels formed in the fore and aft walls 70, 71 of the carrier 24. As the assembled blade track segment 26 and intermediate carrier body 32 are arranged in the attachment-receiving space 57, the seals 98 engage the runner 78 of the blade track segment 26 to seal the attachment-receiving space 57.

Once the couplings 94 are aligned with the corresponding holes formed in the carrier 24, the retainer 36 of the intermediate carrier 28 is coupled with the carrier 24. The retainer 36 is coupled with the carrier 24 by inserting the fasteners 96 through the holes in the carrier 24 and into the respective coupling 94. The fasteners 96 are then tightened to bring the radially-outwardly facing surface 85 of both mount posts 80, 81 into contact with the locating pads 58, 59. In the illustrative embodiment, the orientation features 60, 61, 62, 63 help guide the intermediate carrier body 32 to the correct position so that the locating pads 58, 59 contact the surface 85 of the blade track segment 26 in the correct position.

Figure 9:
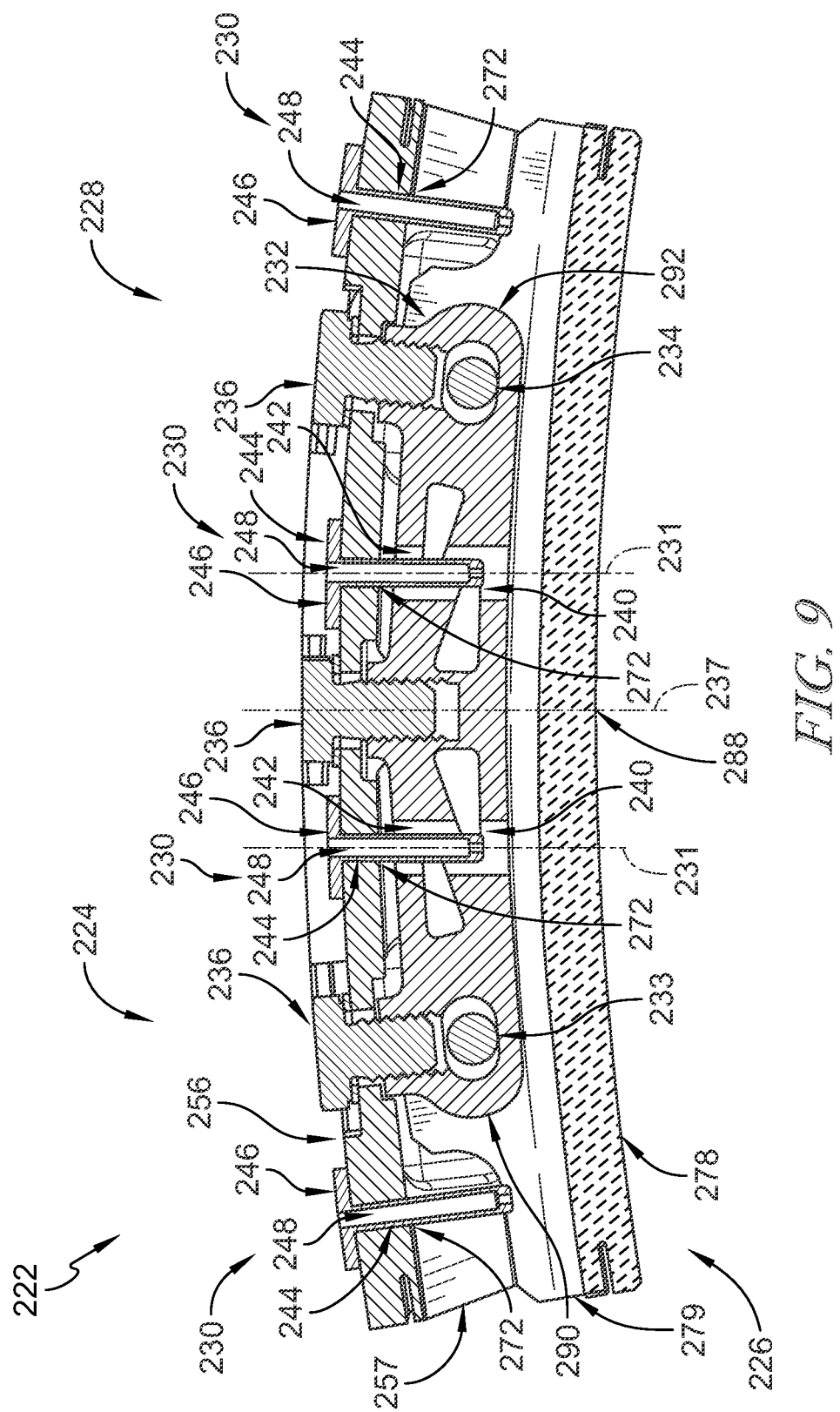
FIG. 9 is a cross-section view of another embodiment of a turbine shroud assembly adapted for use in the gas turbine engine of FIG. 1 showing the turbine shroud assembly includes a plurality of impingement tubes that each are press fit into the corresponding cooling passageway formed in the carrier.

Another embodiment of a turbine shroud segment 222 in accordance with the present disclosure is shown in FIG. 9. The turbine shroud segment 222 is substantially similar to the turbine shroud segment 22 shown in FIGS. 1-8 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a carrier 224, a blade track segment 226, an intermediate carrier 228 configured to couple the blade track segment 226 to the carrier 224, and a plurality of impingement tubes 230 as shown in FIG. 9. The intermediate carrier 228 is designed to engage the blade track segment 226 so as to couple the blade track segment 226 to the carrier 224 and distribute mounting of the blade track segment 226 to the carrier 224. The impingement tubes 230 are configured to direct cooling air from the cooling air source 21 to the backside 84 of the blade track segment 226. Some of the impingement tubes 230 are configured to direct cooling air through a portion of the intermediate carrier 228.

The intermediate carrier 228 includes an intermediate carrier body 232, pins 233, 234, and a plurality of retainers 236 as shown in FIG. 9. The intermediate carrier body 232 is arranged adjacent to an attachment portion of the blade track segment 226 and is formed to include an impingement passageway 240 that has an inlet 242 aligned with an outlet of a cooling passageway 272 formed in the carrier 224. The pins 233, 234 extend axially through the attachment portion 279 of the blade track segment 226 and the intermediate carrier body 232 to couple the blade track segment 226 to the intermediate carrier body 232. Each of the retainers 236 extends outward from the intermediate carrier body 232 and engages the carrier 224 to couple the intermediate carrier 228 to the carrier 224.

Each impingement tube 230 includes a radial portion 244 and a head 246 as shown in FIG. 9. The radial portion 244 extends radially, while the head 246 extends away from the radial portion 244. Each impingement tube 230 is shaped to define a main passageway 248 that extends radially therethrough.

Each impingement tube 230 is press fit into the corresponding cooling passageway 272 formed in the carrier 224 to fix the impingement tube 230 to the carrier 224. In the illustrative embodiment, the radial portion 244 of the impingement tube 230 is press fit into the cooling passageway 272, while the head 246 of the impingement tube 230 is brazed to the carrier 224. The impingement tubes 230 each extend into the cooling passageway 272 and the impingement passageway 240 to direct the cooling air toward the runner 278 included in the blade track segment 226.

In the illustrative embodiment, the intermediate carrier body 232 includes at least three retainers 236 as shown in FIG. 9. One retainer 236 extends outward from the intermediate carrier body 232 at a center 288 of the intermediate carrier body 232 along a retainer axis 237. The retainer axis 237 extends radially relative to the central axis 11. The other two retainers 236 are located at opposite circumferential ends 290, 292 of the intermediate carrier body 232.

In the illustrative embodiment, one impingement tube 230 is spaced apart circumferentially from the center retainer 236 and another impingement tube 230 is spaced apart circumferentially from the center retainer 236 opposite the one impingement tube 230. Each of the impingement tubes 230 located circumferentially between the retainers 236 extend along a tube axis 231. The tube axis 31 is parallel to the retainer axis 237.

In the illustrative embodiments, other impingement tubes 230 spaced apart circumferentially from the entire immediate carrier body as shown in FIG. 9. One impingement tube 230 is spaced circumferentially from the first circumferential end 290 of the intermediate carrier body, while another impingement tube 230 is spaced circumferentially from the second circumferentially end 292 of the intermediate carrier body. Both impingement tubes 30 extend radially from the carrier body 256.

A method of assembling the turbine shroud segment 222 includes several steps. The method begins by arranging the intermediate carrier body 232 axially between the mount posts included in the attachment portion 279. The intermediate carrier body 232 is arranged in the channel 282 such that the pin holes formed in the intermediate carrier body 232 align circumferentially with the pin holes in both the attachment portion 279.

After arranging the intermediate carrier body 232 between the mount posts, one of the pins 233 is inserted through the attachment portion 279 and the intermediate carrier body 232 to couple the blade track segment 226 to the intermediate carrier body 232. This step is repeated for the other pin 234 such that the pin 234 extends through the attachment portion 279 and the intermediate carrier body 232.

Before the assembled blade track segment 226 and intermediate carrier body 232 may be arranged in the attachment-receiving space 257, the impingement tubes 230 are fixed to the carrier 224. To fix the impingement tubes 230 to the carrier 224, each impingement tube 230 is inserted into the corresponding cooling passageway 272 defined in the carrier 224. The radial portion 244 of each impingement tube 230 is press fit into corresponding cooling passageway 272. The head 246 of each impingement tube 230 is then brazed to the carrier 224 to fix the impingement tubes 230 to the carrier 224.

With impingement tubes 230 fixed to the carrier 224, the assembled blade track segment 226 and the intermediate carrier body 232 are arranged in the attachment-receiving space 257 formed in the carrier 224. The assembled blade track segment 226 and intermediate carrier 228 are arranged such that the impingement tubes 230 extend through the impingement passageways 240 formed in the intermediate carrier body 232 and the holes in the carrier 224 align with the retainers 236. Once the retainers 236 are aligned with the corresponding holes formed in the carrier 224, the retainer 236 of the intermediate carrier 228 is coupled with the carrier 224.

Figure 10:
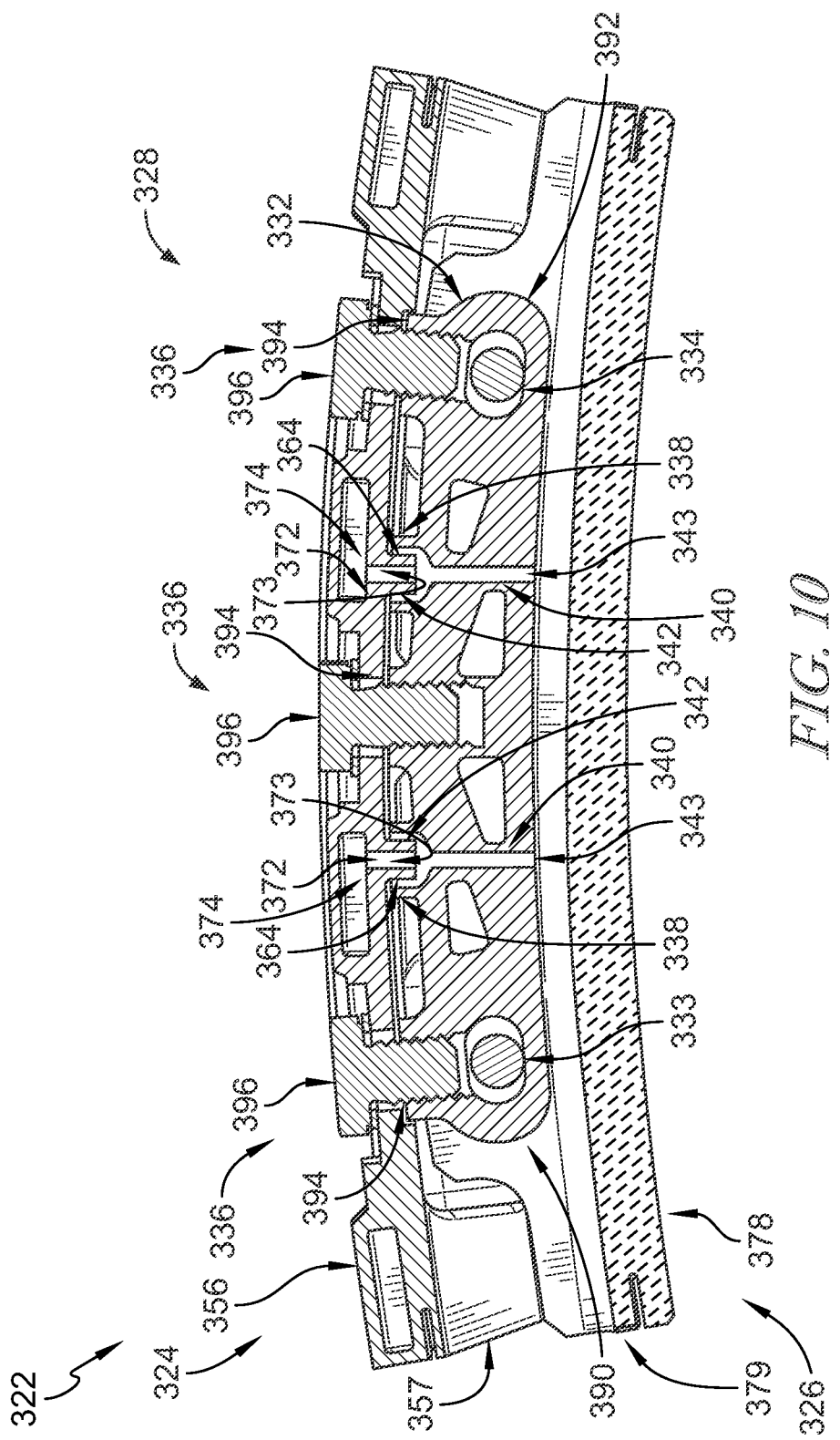
FIG. 10 is a cross-section view of another embodiment of a turbine shroud assembly adapted for use in the gas turbine engine of FIG. 1 in which the carrier includes a plurality of bosses that extend into the impingement passageway formed in the intermediate carrier body.

Another embodiment of a turbine shroud segment 322 in accordance with the present disclosure is shown in FIG. 10. The turbine shroud segment 322 is substantially similar to the turbine shroud segment 22 shown in FIGS. 1-8 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 322.

The turbine shroud segment 322 includes a carrier 324, a blade track segment 326, and an intermediate carrier 328 configured to couple the blade track segment 326 to the carrier 324 as shown in FIG. 10. The intermediate carrier 328 is designed to engage the blade track segment 326 so as to couple the blade track segment 326 to the carrier 324 and distribute mounting of the blade track segment 326 to the carrier 324.

The carrier 324 includes a carrier body 356 and a carrier boss 364 as shown in FIG. 10. The carrier body 356 extends at least partway about the axis 11. The carrier boss 364 extends radially inward from the carrier body 356. In the illustrative embodiment, the carrier 324 includes a plurality of carrier bosses 364 that are spaced circumferentially in between the retainers 336. Each cooling passageway 372 extends through the carrier body 356 and the corresponding carrier boss 364.

The intermediate carrier 328 includes an intermediate carrier body 332, pins 333, 334, a plurality of retainers 336, and impingement bosses 338 as shown in FIG. 10. The intermediate carrier body 332 is arranged adjacent to an attachment portion 379 of the blade track segment 326. The pins 333, 334 extend axially through the attachment portion 379 of the blade track segment 326 and the intermediate carrier body 332 to couple the blade track segment 26 to the intermediate carrier body 332. Each of the retainers 336 extends outward from the intermediate carrier body 332 to the carrier 324 to couple the intermediate carrier 328 to the carrier 324. The impingement bosses 338 extend radially away from the intermediate carrier body 332.

In the illustrative embodiment, each impingement passageway 340 extends through the intermediate carrier body 332 and the impingement boss 338. Each impingement passageway 340 has an inlet 342 that aligns with an outlet 373 of the cooling passageway 372 formed in the carrier. The carrier boss 364 that extends radially inward from the carrier body into the inlet 342 of the impingement passageway 340.

In the illustrative embodiment, the inlet 342 of the impingement passageway 342 has a diameter that is greater than a diameter of the outlet 343 of the impingement passageway 342. In this way, the carrier boss 364 extends into the impingement passageway 342 to minimize leakage of cooling air.

A method of assembling the turbine shroud segment 322 includes several steps. The method begins by arranging the intermediate carrier body 332 axially between the mount posts included in the attachment portion 379. The intermediate carrier body 332 is arranged in the channel 382 such that the pin holes formed in the intermediate carrier body 332 align circumferentially with the pin holes in both the attachment portion 379.

After arranging the intermediate carrier body 332 between the mount posts, one of the pins 333 is inserted through the attachment portion 379 and the intermediate carrier body 332 to couple the blade track segment 326 to the intermediate carrier body 332. This step is repeated for the other pin 334 such that the pin 334 extends through the attachment portion 379 and the intermediate carrier body 332.

With the intermediate carrier body 332 assembled with the blade track segment 326, the assembled components 326, 332 are arranged in the attachment-receiving space 357 formed in the carrier 324. The assembled blade track segment 326 and intermediate carrier 328 are arranged such that the holes in the carrier 324 align with the couplings 394 and the carrier boss 364 extends into the inlet 342 of the corresponding impingement passageway 340. Once the assembled blade track segment 326 and intermediate carrier 328 are arranged in the attachment-receiving space 357, the fasteners 396 include in each of the retainers 336 of the intermediate carrier 328 are coupled with the carrier 324.

Figure 11:
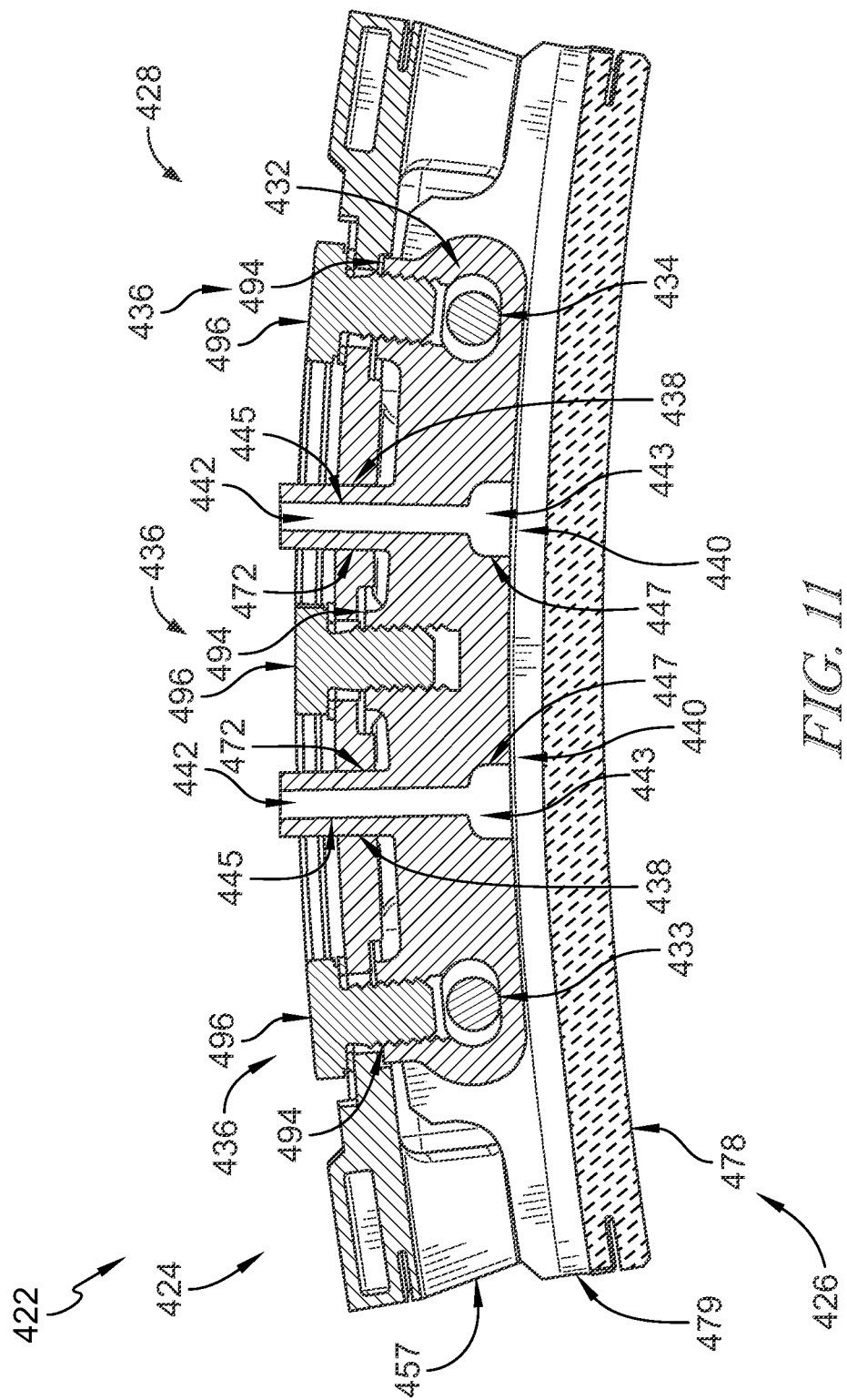
FIG. 11 is a cross-section view of another embodiment of a turbine shroud assembly adapted for use in the gas turbine engine of FIG. 1 showing the intermediate carrier body includes impingement tubes integrally formed with the carrier body that each extend through the corresponding cooling passageway in the carrier.

Another embodiment of a turbine shroud segment 422 in accordance with the present disclosure is shown in FIG. 11. The turbine shroud segment 422 is substantially similar to the turbine shroud segment 22 shown in FIGS. 1-8 and described herein. Accordingly, similar reference numbers in the 400 series indicate features that are common between the turbine shroud segment 22 and the turbine shroud segment 422. The description of the turbine shroud segment 22 is incorporated by reference to apply to the turbine shroud segment 422, except in instances when it conflicts with the specific description and the drawings of the turbine shroud segment 422.

The turbine shroud segment 422 includes a carrier 424, a blade track segment 426, and an intermediate carrier 428 configured to couple the blade track segment 426 to the carrier 424 as shown in FIG. 10. The intermediate carrier 428 is designed to engage the blade track segment 426 so as to couple the blade track segment 426 to the carrier 424 and distribute mounting of the blade track segment 426 to the carrier 424.

The intermediate carrier 428 includes an intermediate carrier body 432, pins 433, 434, a plurality of retainers 436, and impingement bosses 438 as shown in FIG. 10. The intermediate carrier body 432 is arranged adjacent to an attachment portion 479 of the blade track segment 426. The pins 433, 434 extend axially through the attachment portion 479 of the blade track segment 426 and the intermediate carrier body 432 to couple the blade track segment 26 to the intermediate carrier body 432. Each of the retainers 436 extends outward from the intermediate carrier body 432 to the carrier 424 to couple the intermediate carrier 428 to the carrier 424. The impingement bosses 438 are integrally formed with the intermediate carrier body 432 that extends radially away from the intermediate carrier body 432 through a corresponding cooling passageway 472 defined in the carrier 424. In the illustrative embodiment, each impingement passageway 440 extends through the intermediate carrier body 432 and the impingement boss 438.

In the illustrative embodiment, impingement passageway 440 is shaped to include a first portion 445 and a second portion 447 as shown in FIG. 11. The first portion 445 defines the inlet 442 and has a first cross-sectional area. The second portion 447 defines an outlet 443 and has a second cross-sectional area. The second cross-sectional area is greater than the first cross-sectional area in the illustrative embodiment. In other embodiments, the second cross-sectional area of the second portion 447 may be adjusted to minimize localized cooling spots on the blade track segment 426.

A method of assembling the turbine shroud segment 422 includes several steps. The method begins by arranging the intermediate carrier body 432 axially between the mount posts included in the attachment portion 479. The intermediate carrier body 432 is arranged in the channel 482 such that the pin holes formed in the intermediate carrier body 432 align circumferentially with the pin holes in both the attachment portion 479.

After arranging the intermediate carrier body 432 between the mount posts, one of the pins 433 is inserted through the attachment portion 479 and the intermediate carrier body 432 to couple the blade track segment 426 to the intermediate carrier body 432. This step is repeated for the other pin 434 such that the pin 434 extends through the attachment portion 479 and the intermediate carrier body 432.

With the intermediate carrier body 432 assembled with the blade track segment 426, the assembled components 426, 432 are arranged in the attachment-receiving space 457 formed in the carrier 424. The assembled blade track segment 426 and intermediate carrier 428 are arranged such that the holes 449 in the carrier 424 align with the couplings 494 and the impingement boss 438 extends through the corresponding cooling passageway 472. Once the assembled blade track segment 426 and intermediate carrier 428 are arranged in the attachment-receiving space 457, the retainers 436 of the intermediate carrier 428 are coupled with the carrier 424. The retainers 436 are coupled to the carrier 424 by inserting the fasteners 496 of each retainer 436 into the corresponding coupling 494.

The present disclosure teaches a ceramic matrix composite blade track segment 26, 226, 326, 426 with an inverted Pi shape. In such an arrangement, the blade track segment 26, 226, 326, 426 may be supported by two pins 33, 34, 233, 234, 333, 334, 433, 434 and an intermediate carrier body 32, 232, 332, 432. The intermediate carrier body 32, 232, 332, 432 is attached to the carrier 24, 224, 324, 424 with at least three retainers 36, 236, 336, 436 in the illustrative embodiment.

The temperatures on the flow path surface 83 of the ceramic matrix composite blade track segment 26, 226, 326, 426 may exceed the material allowable temperature. The blade track segment 26, 226, 326, 426 may be cooled by adding cooling air to the corresponding areas on the backside 84 of the runner 78 included in the blade track segment 26, 226, 326, 426. However, the intermediate carrier 28, 228, 328, 428 may be block access to the backside 84 of the runner 78 in such embodiments.

As such, the present turbine shroud segment 22, 222, 322, 422 includes modifications to the intermediate carrier body 32, 232, 332, 432 and carrier 24, 224, 324, 424 to direct cooling air to the backside 84 of the ceramic matrix composite blade track segment 26, 226, 326, 426. In the illustrative embodiment, the turbine shroud segment 22, 222 includes metallic impingement tubes 30, 230. The impingement tubes 30 may be brazed into cooling passageways 72 formed in the carrier 24.

In the illustrative embodiment, the impingement tubes 30 may be connected to the CI feed cavities 74 and not the cavity between the carrier 24 and the case 19. The impingement tubes 30 may be shaped to include a small orifice 54 at the radially inward end to impinge on the backside 84 of the runner 78. Some of the impingement tubes 30 may be sized to fit through impingement passageways 40 in the intermediate carrier body 32.

In some embodiments, the impingement tubes 30 may be shaped to include additional orifices 50 on the sides to impinge on the intermediate carrier body 32. In the illustrative embodiments, the impingement tubes 30, 230 that extend through the intermediate carrier body 32, 232 may be vertical or parallel to the center retainer 36, 236 to allow for assembly of the intermediate carrier 28, 228.

In some embodiments, each of the impingement tubes 30 may be threaded into corresponding cooling passageways 72. In illustrative embodiment of FIG. 9, the impingement tubes 230 may be press fit into the cooling passageways 272 in the carrier 224.

In the illustrative embodiments, the impingement tubes 230 may include a radial portion 244 and a head 246. The radial portion 244 may be press fit into the cooling passageway 272, while the head 246 is brazed to the carrier 224. The combination of the brazing with the press fit may minimize the leakage into the attachment-receiving space 257 between the blade track segment 226 and the carrier 224.

In the illustrative embodiment of FIG. 10, the carrier 324 includes carrier bosses 364 that extend from an inner surface of the carrier body 356. The carrier bosses 364 extend into the inlet 342 of the corresponding impingement passageway 340 formed in the intermediate carrier body 332.

The impingement passageways 340 formed in the intermediate carrier body 332 may extend radially inward to impinge cooling air on the backside 84 of the runner 78 included in the blade track segment 326. The carrier bosses 364 may also position the circumferential and axial position of the intermediate carrier body 332. While most of the cooling air may travel down the impingement passageway 340, some cooling may escape through the gap between the carrier 324 and the intermediate carrier body 332.

In the illustrative embodiment of FIG. 11, the intermediate carrier body 432 may be integrally formed with impingement bosses 438 that fit tightly into tolerance cooling passageways 472 in the carrier 424. The impingement bosses 438 may be formed to include the impingement passageways 440. The impingement passageway 440 may extend through the center and extend radially inward to impinge cooling air on the backside 84 of the blade track segment 26.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use in a gas turbine engine, the turbine shroud assembly comprising
a carrier comprising metallic materials and arranged to extend circumferentially at least partway about a center axis, the carrier formed to include a cooling passageway configured to conduct cooling air through the carrier,
a blade track segment comprising ceramic matrix composite materials, the blade track segment formed to include a runner shaped to extend circumferentially partway around the center axis, a first mount post that extends radially outward from the runner, and a second mount post that extends radially outward from the runner, and the second mount post spaced apart axially from the first mount post to define a channel therebetween, and
an intermediate carrier configured to couple the blade track segment to the carrier, the intermediate carrier including an intermediate carrier body arranged axially between the first mount post and the second mount post, at least one pin that extends axially into the first mount post, the intermediate carrier body, and the second mount post to couple the intermediate carrier body to the blade track segment, and a retainer that extends radially and couples the intermediate carrier body with the carrier,
wherein the intermediate carrier body is formed to include an impingement passageway that has an inlet aligned with an outlet of the cooling passageway such that the cooling air is configured to be conducted from the cooling passageway, through the impingement passageway, and directed toward the runner included in the blade track segment to cool the blade track segment.

2. The turbine shroud assembly of claim 1, wherein the turbine shroud assembly further includes an impingement tube that extends into the cooling passageway and the impingement passageway to direct the cooling air toward the runner included in the blade track segment.

3. The turbine shroud assembly of claim 2, wherein the impingement tube defines a main passageway that extends radially through the impingement tube and an auxiliary passageway that extends at an angle relative to the main passageway and is in fluid communication with the main passageway so that the cooling air is directed toward the runner and toward the intermediate carrier body.

4. The turbine shroud assembly of claim 2, wherein the impingement tube is brazed to the carrier to fix the impingement tube to the carrier.

5. The turbine shroud assembly of claim 2, wherein the impingement tube is press fit through the cooling passageway into the carrier to fix the impingement tube to the carrier.

6. The turbine shroud assembly of claim 2, wherein the retainer extends along a retainer axis that extends radially relative to the center axis, the impingement tube is spaced apart circumferentially from the retainer and extends along a tube axis that is parallel to the retainer axis.

7. The turbine shroud assembly of claim 1, wherein the carrier includes a carrier body and an impingement tube that extends radially from the carrier body to direct cooling air toward the runner and the impingement tube is spaced apart circumferentially from the entire intermediate carrier.

8. The turbine shroud assembly of claim 1, wherein the carrier includes a carrier body and a carrier boss that extends radially inward from the carrier body into the inlet of the impingement passageway.

9. The turbine shroud assembly of claim 8, wherein the impingement passageway is shaped to include a first portion having a first cross-sectional area and a second portion defining an inlet and having a second cross-sectional area that is greater than the first cross-sectional area.

10. The turbine shroud assembly of claim 1, wherein the intermediate carrier further includes an impingement boss integrally formed with the intermediate carrier body that extends radially away from the intermediate carrier body through the cooling passageway and the impingement passageway extends through the impingement boss.

11. The turbine shroud assembly of claim 10, wherein the impingement passageway is shaped to include a first portion having a first cross-sectional area and a second portion defining an outlet and having a second cross-sectional area that is greater than the first cross-sectional area.

12. A turbine shroud assembly adapted for use in a gas turbine engine, the turbine shroud assembly comprising
a carrier that extends at least partway circumferentially around a central axis, the carrier formed to define a cooling passageway that extends through the carrier,
a blade track segment that includes a runner shaped to extend circumferentially partway around the central axis and an attachment portion that extends radially outward from the runner, and
an intermediate carrier including an intermediate carrier body coupled with the attachment portion of the blade track segment and a first retainer that extends radially and couples the carrier with the intermediate carrier,
wherein the intermediate carrier body is formed to include an impingement passageway having an inlet aligned with an outlet of the cooling passageway and an exit arranged to direct air toward the blade track segment, and
wherein the carrier includes a carrier body and an impingement tube that extends radially from the carrier body to direct cooling air toward the runner and the impingement tube is spaced apart circumferentially from the entire intermediate carrier.

13. The turbine shroud assembly of claim 12, wherein the impingement tube defines a main passageway that extends radially through the impingement passageway and an auxiliary passageway that extends at an angle relative to the main passageway and is in fluid communication with the main passageway so that the cooling air is directed toward the runner and toward the intermediate carrier body.

14. The turbine shroud assembly of claim 13, wherein the impingement tube is brazed or press fit to the carrier body to fix the impingement tube to the carrier body.

15. The turbine shroud assembly of claim 12, wherein the first retainer extends along a retainer axis that extends radially relative to the central axis, the impingement tube is spaced apart circumferentially from the first retainer and extends along a tube axis that is parallel to the retainer axis.

16. A method comprising
providing a carrier, a blade track segment, an intermediate carrier, and an impingement tube, the blade track segment including a runner shaped to extend partway around an axis, a first mount post that extends radially outward from the runner, and a second mount post spaced apart axially from the first mount post that extends radially outward from the runner, arranging the intermediate carrier axially between the first mount post and the second mount post of the blade track segment, inserting a pin through the first mount post, the intermediate carrier, and the second mount post to couple the blade track segment to the intermediate carrier body, inserting the impingement tube into a cooling passageway defined in the carrier fixing the impingement tube to the carrier, arranging the intermediate carrier in an attachment space formed in the carrier so that the impingement tube extends through the impingement passageways, and coupling the intermediate carrier with the carrier.

* * * * *